(12) United States Patent
Wendt et al.

(10) Patent No.: US 9,847,885 B2
(45) Date of Patent: Dec. 19, 2017

(54) POWER NEGOTIATION IN DAISY-CHAINED SYSTEMS

(71) Applicant: PHILIPS LIGHTING HOLDING B.V., Eindhoven (NL)

(72) Inventors: Matthias Wendt, Würselen (DE); Lennart Yseboodt, Retie (BE); Bozena Erdmann, Aachen (DE); Manuel Eduardo Alarcon-Rivero, Delft (NL); Maurice Herman Johan Draaijer, Ittervoort (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/906,046

(22) PCT Filed: Jul. 18, 2014

(86) PCT No.: PCT/EP2014/065513
§ 371 (c)(1),
(2) Date: Jan. 19, 2016

(87) PCT Pub. No.: WO2015/007888
PCT Pub. Date: Jan. 22, 2015

(65) Prior Publication Data
US 2016/0191256 A1 Jun. 30, 2016

(30) Foreign Application Priority Data
Jul. 19, 2013 (EP) ...................................... 13177271

(51) Int. Cl.
*H04L 12/10* (2006.01)
*G06F 1/26* (2006.01)

(52) U.S. Cl.
CPC ................ *H04L 12/10* (2013.01); *G06F 1/26* (2013.01)

(58) Field of Classification Search
CPC .................................. H04L 12/10; G06F 1/26
See application file for complete search history.

(56) References Cited

U.S. PATENT DOCUMENTS

| | | | |
|---|---|---|---|
| 7,664,136 B2 * | 2/2010 | Toebes | G06F 1/266 370/463 |
| 7,903,809 B2 * | 3/2011 | Karam | G06F 1/26 379/413 |
| 7,923,857 B2 | 4/2011 | Langlois et al. | |
| 8,261,001 B2 * | 9/2012 | Bobrek | G06F 1/266 710/310 |
| 2006/0100799 A1 | 5/2006 | Karam | |
| 2006/0177192 A1 | 8/2006 | Jonnala et al. | |
| 2006/0273661 A1 | 12/2006 | Toebes et al. | |
| 2007/0029879 A1 | 2/2007 | Eldredge | |
| 2012/0286574 A1 | 11/2012 | Sawada et al. | |

FOREIGN PATENT DOCUMENTS

DE 7923857 A1 7/1999

* cited by examiner

*Primary Examiner* — Stefan Stoynov
(74) *Attorney, Agent, or Firm* — Meenakshy Chakravorty

(57) ABSTRACT

The invention relates a method and apparatus for distributing power in DC-grid systems, wherein power negotiations are done in a daisy chained system. Multiple mechanisms are presented mitigating the issue of stepwise exploring the power requests along a chain and still keeping the negotiation quick and without many cycles required.

8 Claims, 3 Drawing Sheets

POWER NEGOTIATION IN DAISY-CHAINED SYSTEMS

CROSS-REFERENCE TO PRIOR APPLICATIONS

This application is the U.S. National Phase application under 35 U.S.C. §371 of International Application No. PCT/EP2014/065513, filed on Jul. 18, 2014, which claims the benefit of European Patent Application No. 13177271.7, filed on Jul. 19, 2013. These applications are hereby incorporated by reference herein.

FIELD OF THE INVENTION

The invention relates to the field of methods and devices for distributing power in DC grid systems, such as—but not limited to—lighting systems.

BACKGROUND OF THE INVENTION

US 2012/0286574 A1 discloses an electric power system with a first unit equipped with a first power source, a first rechargeable battery connected to an output of the first power source and a first power consuming portion connected to an output of the first rechargeable battery. The electric power system further comprises a second rechargeable battery and an electrical power line for sharing electric power between the first rechargeable battery and the second rechargeable battery.

US 2007/0029879 A1 discloses a DC power distribution system comprising a DC power converter configured to provide DC power to at least one DC powered electronic device and at least one DC conductor set for coupling the DC power converter to at least one DC outlet, wherein the DC outlet is adapted to connect the at least one DC powered electronic device to the DC power distribution system.

U.S. Pat. No. 7,923,857 B2 discloses a system for supplying power to a plurality of actuators on board of an aircraft. The system comprises a plurality of generators to supply alternating current and a plurality of conventional electrical master boxes configured to supply power to power loads, wherein the plurality of conventional electrical master boxes has a plurality of power transfer units and is positioned at a first and second side of the aircraft. The power loads include air conditioning units, units to protect against icing and engine starters. The system further comprises two devoted master boxes configured to each receive power from a least one conventional master box via the plurality of power transfer units and to supply the power only to actuator loads, wherein the two devoted master boxes are connected to the plurality of conventional electrical master boxes at the first and second side of the aircraft and wherein the actuator loads include flight control and wheel brakes.

DE 197 57 113 A1 discloses a coupling network for supplying DC power from a DC power network to a consumer, wherein the coupling network comprises a circuit unit for switching the power supply on and off. The power supply comprises at its input side two separate subnetworks, which at the output side are connected with electrical consumers via electrically actuatable switches such that each subnetwork contributes to the supply of the electrical consumers at the output side depending on the respective capability.

Power-over-Ethernet (PoE) is a standard to supply power to detached data equipment and peripherals (like routers, switches, printer spoolers etc.) through the same wire or network connection that is already used to connect these to the Ethernet. Currently discussions are coming up to (mis) use the same standard for all kinds of low power loads like lighting equipment (sensors, switches, light sources etc.) or entertainment appliances like active speakers, internet radios, DVD player, set-top boxes and even TV sets. Here, actual standardization in IEEE802.3 is going on to support power levels even up to 60 W per Cat5/6 connection.

One upcoming field for applying PoE is in lighting systems. The new generation of LED based lamps make use of a central power supply as provided by PoE in the network infrastructure. In addition the use of cheap network cables reduces installation costs and inherent safety (due to low DC power) and polarity independence reduce installation errors which, if they occur during installation, can be identified immediately because power does not need to be shut off like required in conventional lighting installations connected to mains directly. Most load devices are light sources. However, other devices like sensors or user interface devices (switches, control panels) may also be powered by PoE.

As PoE supply systems for power distribution inside of buildings get into the view of the industry, specific drawbacks of these networks need to find solutions in order to get these direct current powered networks (so called "DC-Grids") widely employed. When the PoE standard was introduced for supplying power to detached networking devices like routers, switches, printer spoolers, etc., it was a replacement for small power-plug type power supplies, since the originally intended loads where mostly already equipped with communication and processing means.

FIG. 1 shows a typical connection of a conventional PoE system comprising a power sourcing equipment (PSE) 1 and one PoE load 20 usually called powered device (PD). A connection may be implemented by means of a so called patch cable 14 between one of a plurality of output jacks or ports 12 of the PSE 1 and an input jack or port 21 of the PD 20. In PoE systems, typically power supplies 11, 24 and data connectivity of a data processing functions 19, 25 are sharing the same patch cable 14. In multi load systems, each load gets connected by a PSE manager 18 to a separate one of the plurality of output ports consisting of first port (P1) 12 to an n-th port (Pn) 13 of the PSE 1. So each load, such as the PD 2, negotiates separately the availability of required power with the PSE 1. This requires a powered device controller 23 in each load (i.e. PD 20). On the PSE side a PSE management controller 18 supervises the negotiations on all ports.

However, in the new application field of lighting systems or similar load systems with often small loads with low local computing and communication requirements, sometimes the overhead of communication and processing compared to the load complexity is inappropriate. Moreover, another shortcoming of PoE is its purely star-based network topology, while lighting systems are often wired in a serial manner (i.e. daisy-chained). Due to this, implementation of the star-based PoE in these kinds of typically serially connected load systems would lead to increased total cable lengths and thick cable bundles in comparison with a truly serially connected implementation. In cases where light systems connected to PoE are equipped with local storage and lights do not need to be switched on continuously like in many cases, the load over the serially connected cables can be divided in time resulting in a far more limited current in the cable which is closest to the PoE switch.

SUMMARY OF THE INVENTION

It is an object of the present invention to implement PoE-type power negotiation solutions for serial load system at reduced connection requirements.

This object is achieved by a device as claimed in claim 1.

Accordingly, a device for power negotiation in a PoE network, i.e. a PoE device, can be used in a chain of devices, wherein the PoE device can receive power requests from a subsequent device, which is preferentially also a PoE device, and wherein the PoE device can negotiate power to be received by the PoE device with a preceding PoE device or with a PoE power source to which the input port of the PoE device may be connected. The power received by the PoE device is preferentially only partly used by the PoE device, wherein a part of the received power is forwarded to one or several subsequent devices in the chain of devices. Thus, power negotiations can be done in a daisy chained system while multiple mechanisms can be presented to mitigate the issue of stepwise exploring the power requests along the chain and still keeping the negotiation quick and without many cycles required. The proposed chain configuration or daisy chaining leads to reduced total cable length and average thickness of cable bundle.

According to a first aspect, the chain controller may be adapted to negotiate via the input port a predetermined maximum power amount deliverable by a power source device if the chain controller detects that the power source device is connected to the input port, and to subsequently initiate power negotiation with the subsequent device based a remaining power amount after deduction of an own required power amount from the maximum power amount. Thereby, the system sequentially powers up in an efficient manner from the first device being connected to the power source device (e.g. PSE) directly. In a further option, the chain controller may be adapted to deactivate the output port if it determines that the remaining power amount is not enough. This ensures that sufficient power is always provided to subsequent load devices.

According to a second aspect, the chain controller may be adapted to negotiate via the input port an own power amount of the device plus a predetermined additional power amount, if the chain controller detects that a power source device is connected to the input port and that the subsequent device is connected to the output port. This ensures quick negotiation and fast power-up, since the first load device in the chain configuration does not have to wait for requests from subsequent load devices. According to another option, the chain controller may be adapted to perform power negotiation with the subsequent device via the output port, if the chain controller detects that a power amount negotiated via the input port has been received, and to subsequently re-negotiate power at the input port in response to a negotiation result at the output port. Thereby, a minimum amount of power is always claimed from the power source device.

According to a third aspect, if the chain controller detects that a power source device is connected to the input port, the chain controller may be adapted to negotiate via the input port a predetermined maximum power amount deliverable by a power source device, the device is adapted to subsequently only supply power to the chain controller in a first phase, the chain controller may be adapted to wait for a power request from the subsequent device at the output port in a second phase, the power request indicating a requested power sum of all subsequent devices of the chain configuration, and the chain controller may be adapted to instruct via the output port that all subsequent devices can activate to their full requested power if the requested power sum is less or equal the negotiated maximum power amount. This provides the advantage that all load devices of the chain configuration negotiate simultaneously and are powered at the same time. As another option, if the chain controller detects that the device is a second device in the chain configuration, the chain controller may be adapted to trigger via the input port negotiation of a lower power amount corresponding to the requested power sum. This ensures that only the minimum power amount is negotiated for the chain configuration.

Additionally, if the chain controller detects that the device is a last device of the chain connection with no device connected at the output port, the chain controller may be adapted to transmit a request for an own power amount of the device via the input port together with a lowest sequence number or to broadcast a trigger message for power requests to all devices of the chain configuration. Thus, it can be ensured that the power requests are initiated at the last load device of the chain configuration.

Furthermore, if the chain controller detects that the device is not the last device of the chain connection and that no power source device is connected to the input port, the chain controller may be adapted to determine an own sequence number of the device based on a sequence number included in the power request received via the output port, to generate an enhanced power request by adding information about the own sequence number and an own power amount to the received power request, and to forward the enhanced power request via the input port. Thereby, load devices within the chain configuration are allowed to determine and add their sequence number to the power request so that the first load device which is connected to the power source device knows the total amount or sum of requested power and the origin of the individual power requests.

According to a fourth aspect, the device may comprise a memory for storing a power request value, wherein the chain controller may be adapted to determine a power request value received with the power request at the output port, to add the stored power request value to the received power request value in order to obtain a sum value, and to transmit the sum value via the input port if the chain controller detects that another device of the chain configuration is connected to the input port. As a further option, the chain controller may be adapted to perform power negotiation at the input port using the sum value if the chain controller detects that a power source device is connected to the input port. Additionally, the chain controller may be adapted to perform power negotiation at the input port using the sum value if the chain controller detects that a power source device is connected to the input port. Thereby, long time delays can be prevented, since the first load device does not have to wait until the last load device is requesting power.

According to a fifth aspect which can be combined with at least one of the first to fourth aspects, the chain controller may be adapted to store at least one of a result of power negotiation and addresses of neighboring devices in the chain configuration so as to be re-called after a power-off state. Thereby, fast system recovery or power-up can be ensured.

According to a sixth aspect which can be combined with at least one of the first to fifth aspects, the chain controller may be adapted to restart power negotiation upon any detection of a device connection or disconnection in said chain configuration. This measure ensures that power supply can always be adapted to actual needs of the chain.

It is noted that the device may be implemented based on discrete hardware circuitry with discrete hardware components, an integrated chip, or an arrangement of chip modules, or based on a signal processing device or chip controlled by a software routine or program stored in a memory, written on a computer readable medium, or downloaded from a network, such as the Internet.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a lighting or illumination system comprising a chain configuration of luminaires, wherein power negotiations are done in a daisy-chained PoE system. Multiple mechanisms are presented mitigating the issue of stepwise exploring the power requests along the chain configuration and still keeping the negotiation quick and without a lot of negotiation cycles required.

Figure 1:
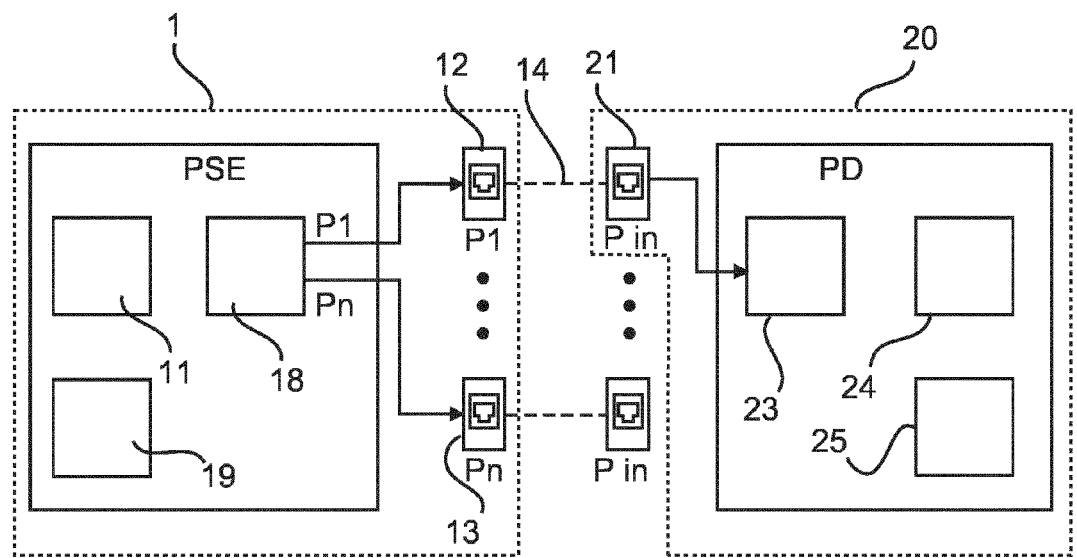
FIG. 1 shows a schematic block diagram of a conventional PoE connection.
Figure 2:
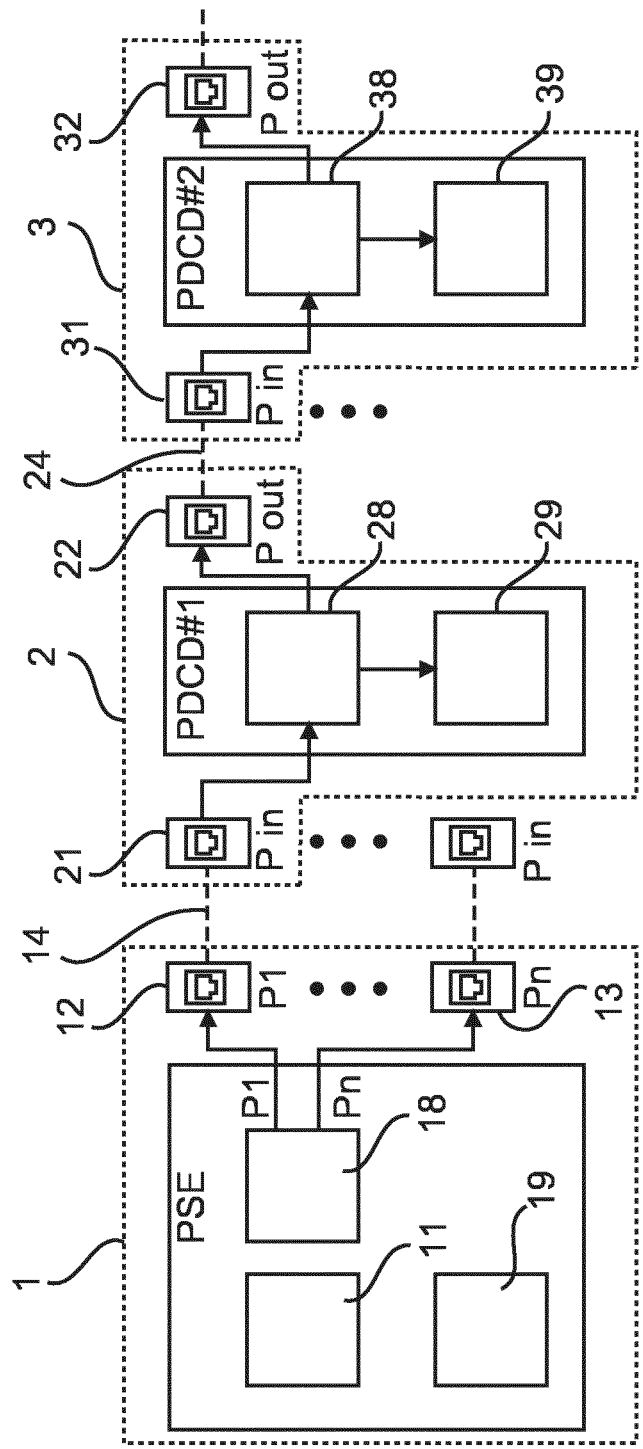
FIG. 2 shows a schematic block diagram of a daisy chained PoE connection according to various embodiments.

FIG. 2 shows functional blocks of the daisy-chained PoE system according to various embodiments. The PoE system comprises a power sourcing equipment (PSE) 1 and in this example two chainable PoE load devices or loads 2 and 3 (from now on called powered daisy chain device (PDCD)) connected via a respective patch cables 14 and 24. The PSE 1 does not have to be modified and can thus be a non-modified typical PoE power source. Similar to FIG. 1, it comprises a PSE manager 18, a power supply 11 and a (network) data processing function 19. The chainable devices PDCD 2, 3 as described hereinafter are seen from the PSE 1 as a single PD (with cumulative and/or changing power consumption) connected to only one port 12 of the PSE 1.

Furthermore, each PDCD 2, 3 comprises an input port 21, 31 and an output port 22, 32. The output port gets connected to the input port of the next PDCD in line again via a patch cable 24. Moreover, each PDCD 2, 3 comprises a daisy chain device controller 28, 38 for controlling power negotiation in the chain configuration and a load controller 29, 39 for controlling load (i.e. requested power amount) in response to a control output received from the daisy chain device controller 28, 38. The embodiments therefore allow for an arbitrary number of chained PDCD devices. Dependant on the type of the PSE 1 this can be accomplished by the PDCD in multiple ways. A requirement for this is that the total load of the chain configuration presented or connected to the PSE 1 does not increase over a maximum agreed power, as negotiated during start-up. PSEs may differ in the time it takes before the chain configuration is stably powered and in the number of loads that can be supported (e.g. PoE 12.5 W, PoE+25.5 W or future systems like PoE++50 W).

Figure 3:
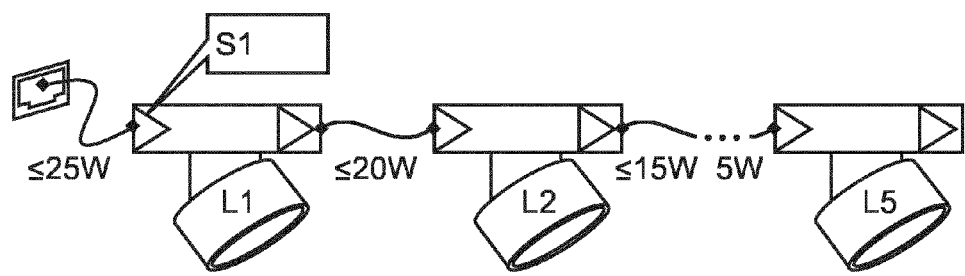
FIG. 3 shows a schematic block diagram which indicates steps of a power negotiation procedure according to a first embodiment.

FIG. 3 shows a schematic block diagram which indicates steps of a power negotiation procedure according to a first embodiment. In the first embodiment, the system at power-up sequentially powers up, beginning from the first PDCD L1 being connected to the PSE 1 directly. The first PDCD L1 in line claims in a first message or request S1 maximum power deliverable by a single PoE port, so when adhering to PoE+ standard this is 25.5 W, for example. The output port of the first PDCD L1 starts negotiation with the input port of the second PDCD L2 and will give it maximally the power remaining when the negotiated input power gets reduced by the power required by the first PDCD L1 itself.

In the example shown in FIG. 3, the devices (i.e. PDCDs) L1 to L5 in the chain are all the same type spot lamps needing e.g. 5 W for the internal controls and to power the lamp. In this example, the first PDCD L1 can advertise 25.5 W-5 W hence maximum available power on its output port is 20.5 W. The second chain member L2 will negotiate 15.5 W towards the downstream neighbor. The third will give 10.5 W down to the forth which advertises 5.5 W to the fifth L5 which will allow the next to get 0.5 W which is not sufficient for powering the lamp 6. So lamp 5 may de-activate the output port. Alternatively, lamp 6 might remain off and give the 0.5 W further just in case there is a member that can operate from that (or, lamp 6 may only turn on some communication/logic or may offer reduced functionality such as e.g. dimmed flux, to report the problem). Feedback can thus be provided to the system/user, that a device is attached to the chain that cannot be powered. The feedback allows the user (installer) to recognize the reason for the behavior of lamp 6 (exceeded power budget rather than hardware failure). The feedback can be given via communication means, if available, or e.g. via a particular light blinking pattern, e.g., on the last powered device in the chain or a status light emitting diode (LED) on the first unpowered device in the chain configuration, or e.g. reduced flux light blinking as far as available power allows.

The actual detection of a newly connected device at the output port can be managed by a PoE signature detection mechanism as specified in the PoE standard, i.e., non-populated ports are not powered but will get pulsed with a sensing voltage to detect the presence of the PoE signature impedance. Further details can be gathered from the corresponding power negotiation methods as specified in IEEE802.3af/at.

Furthermore, the PSE 1 could use a different voltage level than the chain members (i.e. PDCDs), immediately indicating the (maximum) power level that the next in chain can request. The protocol could be extended such that the chain members can recognize their place in the chain (at least: attached to PSE vs. attached to another chain member).

The above first embodiment provides the advantage that a simple power budget negotiation can be provided at all chain stages. Moreover, no hardware or software or protocol modifications are required at the PSE. The last-in-chain device can be a legacy PoE load. Hardware implementation of the PDCDs can be kept simple, esp. power supply logic, since they do not need to differentiate between full operation (load+chain controller) and stand-by operation (chain controller only).

The first embodiment can be enhanced in that each PDCD, starting with the first PDCD next to the PoE, initially only negotiates on its input port only the amount of power corresponding to its own power consumption plus a pre-defined power amount for one further device. This additional amount of power consumption may only be requested if it is detected by the chain controller that a further device is connected at the output port, e.g. by a physical connection. The additional amount may correspond e.g. to the power consumption of the chain controller (e.g. a micro controller) of the second PDCD, the amount the first PDCD is consuming, or a typical/maximum power consumption per load (i.e. PDCD) in this type of system.

Thus, the first PDCD (e.g. lamp) in the chain gets powered, then it negotiates with the next PDCD in the chain, and subsequently re-negotiates upstream (with the PoE).

This approach has the advantage of only requesting the minimum amount of additional power.

Figure 4:
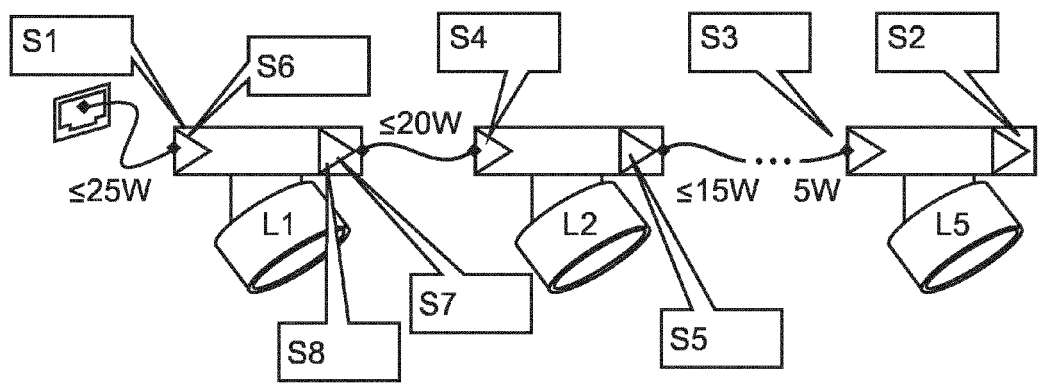
FIG. 4 shows a schematic block diagram which indicates steps of a power negotiation procedure according to a second embodiment.

FIG. 4 shows a schematic block diagram which indicates steps of a power negotiation procedure according to a second embodiment.

Similar to the first embodiment, the first load device L1 (e.g. a spot lamp) claims in a first message or request S1 maximum amount of available power and gives downstream what remains reduces this issue. However, in the second embodiment, the device L1 does not switch on the load but powers only the processor (of the chain controller) in a first negotiation phase (initialization phase). So, even if for instance 20 load devices form a chain and their processing driving takes 100 mW each, only 2 W will be consumed in the first phase in total and all processors get power. In the second phase the load devices of the chain or chain members signal upstream (i.e. towards the PSE) how much power they would like claiming.

Thus, during the initialization phase only the first load device L1 in the chain starts the negotiation (for the full power for the entire chain). This is accomplished by the first load device L1 connected directly to the PSE, after finalizing the negotiation with PSE (on its input port). However, it does not starting negotiation on its output port yet. Thus, there will also be no negotiation further down the chain in this initial phase.

As all load devices L1 to L5 need minimal power for operating their chain controllers, each respective power request for the initial initialization phase will be accepted along the chain.

The load device L5 with no load device (i.e. PDCD) connected to the output port (i.e. the last load device L5 in the chain here shown as the most right lamp of FIG. 4) recognizes this by S2 ("No connection! I am #1") and starts sending a message or request S3 ("I am #1 and need 5 W") into the network containing the amount of power it would like to get for its full function.

The fact of being last in the chain is recognized by the lack of physical connection at the output port and/or by the lack of the power consumption at the output port.

The last load device L5 may also add a sequence number #1 as it is the first load seen from the end of the chain. Optionally, the message S3 may contain the acceptable power steps for a latter mitigation process if too much power gets requested.

Further information can optionally be included in the message S3 for the purpose or more detailed power negotiation and/or subsequent control, e.g. device identifier, device type (e.g. device lamp/sensor), information representative of device vendor/model, etc.

The second load device from the end of the chain receives that message S3 at its output port and knows now that it is thus load device #2 as it received a message with sequence number #1. It adds to the message S3 of the first load L5 from the end of the chain an information regarding own power request and optionally the optional information as named above. In addition, the second load device may also send an acknowledging message to the first load device #1.

The information on N load devices since the end of the chain can be passed up the chain as N independent messages (preferably, with the message from the load device with the highest load number first), as one message concatenating the input of the N load devices, or as one message, containing the aggregated values, at the minimum the cumulative power level (and optionally the number of load devices, and the optional cumulative power steps for the mitigation process, if required).

Along the chain thus the messages are given up to the load device L1 connected directly to the PSE, which knows from the fact of previously performing the power negotiation directly with the PSE, that it is next to the PSE (alternatively, if the PSE is assumed not to support the power budget discovery exchange, the load device L1 next to the PSE can detect its location e.g. by a timeout of waiting for the acknowledgement message). For example, load device L2 may request power by S4 ("I am #2 and need 5 W for #1 and 5 W for me") and my acknowledge by S5 ("ok #1, please wait for chain to complete!"). The first load device L1 may request from the PSE by S6 ("I am #3 and need 10 W for #1 and #2 and 5 W for me!"). Then, the first load device L1 may acknowledge by S7 (ok #2, please wait for chain to complete!"). This first load device L1 has now the complete list of the chain requests and can calculate the sum of requested power.

If the sum is at or below the negotiated power from the PSE it sends an appropriate message S8 ("I am #3 and the last in the chain. We have sufficient power for #1 and #2. You can switch on!") downstream so that all load devices can activate to their full requested power.

Alternatively, if the sum is below the negotiated power, the load #3 can trigger negotiation of the lower amount corresponding to the sum.

In the following, mitigation options are explained, that can be implemented if the sum of requested power is above the power level that got accepted.

In the simplest approach the load devices starting from the beginning of the chain (left end in FIG. 3) get instructed to consume their maximum requested power (e.g. get commanded on) until the allowed power is used up. Installers will see that lamps keep off and may start a new chain. Alternatively, the chain can also provide some feedback using the communication protocol.

In more developed systems potential for mitigation is used reducing all loads of the chain devices to a fraction as available and get most possible loads powered. This solution may result in user-perceivable effects (e.g. light dimming). The installers would have to judge the effect and start a new chain, if required.

Systems on higher level can get informed about the situation as requested powers of all loads and the available mitigation options have been collected. This may lead to notes to the installer and to a more sophisticated mitigation, e.g., not all loads get reduced to the same amount. As an example, load devices more near to the chain end may receive highest reductions.

The second embodiment provides the additional advantage that all load devices (e.g. lamps) in the chain negotiate simultaneously and power on at the same time The second embodiment may be modified in that, triggered by a (broadcast) message of the load device at the end of the chain (the one with no other load connected downstream), the other load devices in the chain can each independently report (broadcast) only own power requirements. This information can then be aggregated in only one of the devices, e.g. the PSE port. Alternatively, the communication can take place on another communication interface, e.g. using 802.11, and the data can be aggregated by another device. This removes some computational requirements on the chained devices (e.g. power calculation, memorizing order/neighbor addresses).

In the following, a third embodiment is described, where power negotiation is configured to prevent for long time delays when the first load device (e.g. lamp or luminaire) has to wait until the last load device is requesting power. This can also be used before the load devices are installed because it houses in the load device itself and the load devices can be provided with small amount of power, probably a battery or energy scavenger, to send the amount of power to be used by the load device.

According to the third embodiment, a power request value (indicating the amount of required power) is embedded or stored in the load device itself. Once the load device is attached to one or more neighbor devices (e.g. detected by discovering a physical connection on the upstream port), it gives this request number and the neighbor devices add this to their own request number. This is done until the connector to the PSE delivering the power is reached and then it is checked whether the connector can deliver this power. At this stage, the load device connected directly to the PSE can perform regular PoE negotiation, requesting the cumulative power. If yes, then lamps are powered. If not, then an indication may be given what to do; e.g. mitigation techniques like above described can be used.

In a modification of the above embodiments, the daisy chained load devices may have on one side (e.g. at the input port) a preinstalled patch cable in order to guarantee that installers do not get confused by two RJ45 jacks for power in and power out. This also has the benefit during installations that lamps get placed and the cable is already there and needs only to be thrown over the ceiling towards the previous member in the daisy chain (or the PSE if it was the first member just installed).

In further modification of the embodiments, the negotiations in the chain are only executed once and the result is stored in all load devices and recalled at or after next power off. In this case, identification information of the left and right chain neighbors may be stored as well, e.g., by means of the Media Access Control (MAC) address in order to detect chain changes, if any, and start a new negotiation. The power negotiations can also be re-started upon any device connection/disconnection in the chain, optionally after timeout/after checking the address of the new neighbor.

To summarize, a method and apparatus for distributing power in DC-grid systems have been described, wherein power negotiations are done in a daisy chained system. Multiple mechanisms are presented mitigating the issue of stepwise exploring the power requests along a chain and still keeping the negotiation quick and without many cycles required.

While the invention has been illustrated and described in detail in the drawings and foregoing description, such illustration and description are to be considered illustrative or exemplary and not restrictive. The invention is not limited to the disclosed embodiment with the lamps or luminaires as load devices. It can be implemented in connection with any type loads, sensors, switches etc. for DC distribution networks.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 3 and 4 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A particular device for power negotiation in a Power-over-Ethernet (PoE) network where power is supplied through network connections, said particular device comprising:
   an input port;
   an output port for connection to an input port of a subsequent device in a chain configuration; and
   a chain controller for negotiating power requests or available power in said chain configuration, said chain controller being adapted to receive a power request from said subsequent device via said output port and to negotiate power, which should be received, via said input port;
   wherein if said chain controller detects that a power source device is connected to said input port, said chain controller is adapted to negotiate via said input port a predetermined maximum power amount deliverable by a power source device, said particular device is adapted to subsequently only supply power to said chain controller in a first phase, said chain controller is adapted to wait for a power request from said subsequent device at said output port in a second phase, said power request indicating a requested power sum of all subsequent devices of said chain configuration, and said chain controller is adapted to instruct via said output port that said all subsequent devices can activate to their full requested power if said requested power sum is less or equal to said negotiated maximum power amount.

2. The device of claim 1, wherein if said chain controller detects that said particular device is a second device in said chain configuration, said chain controller is adapted to trigger via said input port negotiation of a lower power amount corresponding to said requested power sum.

3. The device of claim 2, wherein if said chain controller detects that said particular device is a last device of said chain connection with no device connected at said output port, said chain controller is adapted to transmit a request for an own power amount of said particular device via said input port together with a lowest sequence number or to broadcast a trigger message for power requests to all devices of said chain configuration.

4. The device of any one of claim 3, wherein if said chain controller detects that said particular device is not said last device of said chain connection and that no power source device is connected to said input port, said chain controller is adapted to determine an own sequence number of said particular device based on a sequence number included in said power request received via said output port, to generate an enhanced power request by adding information about said own sequence number and an own power amount to said received power request, and to forward said enhanced power request via said input port.

5. The device of claim 1, further comprising a memory for storing a power request value, wherein said chain controller is adapted to determine a power request value received with said power request at said output port, to add said stored power request value to said received power request value in order to obtain a sum value, and to transmit said sum value via said input port if said chain controller detects that another device of said chain configuration is connected to said input port.

6. The device of claim 5, wherein said chain controller is adapted to perform power negotiation at said input port using said sum value if said chain controller detects that a power source device is connected to said input port.

7. The device of claim 1, wherein said chain controller is adapted to store at least one of a result of power negotiation and addresses of neighboring devices in said chain configuration so as to be re-called after a power-off state.

8. The device of claim 1, wherein said chain controller is adapted to restart power negotiation upon any detection of a device connection or disconnection in said chain configuration.

* * * * *